(12) United States Patent
Park et al.

(10) Patent No.: US 11,145,463 B2
(45) Date of Patent: Oct. 12, 2021

(54) MULTILAYER CAPACITOR

(71) Applicant: SAMSUNG ELECTRO-MECHANICS CO., LTD., Suwon-si (KR)

(72) Inventors: Byeong Gyu Park, Suwon-si (KR); Yong Jin Yun, Suwon-si (KR); So Ra Kang, Suwon-si (KR); Jung Min Park, Suwon-si (KR); Jea Yeol Choi, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

(21) Appl. No.: 16/525,981

(22) Filed: Jul. 30, 2019

(65) Prior Publication Data
US 2020/0075259 A1    Mar. 5, 2020

(30) Foreign Application Priority Data

Sep. 5, 2018   (KR) .................. 10-2018-0105798
Oct. 15, 2018  (KR) .................. 10-2018-0122624

(51) Int. Cl.
| | |
|---|---|
| *H01G 4/30* | (2006.01) |
| *H01G 4/012* | (2006.01) |
| *H01G 4/232* | (2006.01) |
| *H01G 4/224* | (2006.01) |
| *H01G 4/12* | (2006.01) |

(52) U.S. Cl.
CPC ............. *H01G 4/30* (2013.01); *H01G 4/012* (2013.01); *H01G 4/224* (2013.01); *H01G 4/232* (2013.01); *H01G 4/12* (2013.01)

(58) Field of Classification Search
CPC ........... H01G 4/224; H01G 4/30; H01G 4/232
See application file for complete search history.

(56) References Cited

U.S. PATENT DOCUMENTS

| | | | |
|---|---|---|---|
| 2007/0211404 A1 | 9/2007 | Kojima et al. | |
| 2014/0301012 A1 | 10/2014 | Kim | |
| 2016/0049256 A1 | 2/2016 | Kitano et al. | |
| 2016/0196918 A1* | 7/2016 | Hong | H01G 4/0085 174/260 |

(Continued)

FOREIGN PATENT DOCUMENTS

| | | | | | |
|---|---|---|---|---|---|
| JP | 07183154 A | * | 7/1995 | | |
| JP | 2001250736 A | * | 9/2001 | | |
| JP | 2006229005 A | * | 8/2006 | ............. | H01G 4/232 |

(Continued)

OTHER PUBLICATIONS

Office Action issued in corresponding Korean Patent Application No. 10-2018-0122624 dated Jan. 6, 2020, with English translation.

*Primary Examiner* — Eric W Thomas
(74) *Attorney, Agent, or Firm* — Morgan, Lewis & Bockius LLP

(57) ABSTRACT

A multilayer capacitor includes a body, a plurality of internal electrodes, and an external electrode. A cover portion of the body has curved corners, and a radius of curvature, R, of each of the curved corners and a thickness, T, of the body satisfy a condition of 10 μm≤R≤T/3, and a width, W, and a thickness, T, of the body satisfy a condition of T/W<0.8.

22 Claims, 13 Drawing Sheets

(56) References Cited

U.S. PATENT DOCUMENTS

2018/0160541 A1\* 6/2018 Fujita .................. H05K 1/186
2018/0182555 A1   6/2018 Kowase

FOREIGN PATENT DOCUMENTS

| | | | |
|---|---|---|---|
| JP | 2006-278557 | A | 10/2006 |
| JP | 2006278557 | A \* | 10/2006 |
| JP | 2007-243040 | A | 9/2007 |
| JP | 2011-003845 | A | 1/2011 |
| JP | 2018-107239 | A | 7/2018 |
| JP | 2018-137285 | A | 8/2018 |
| KR | 10-2014-0121725 | A | 10/2014 |
| KR | 10-2016-0020354 | A | 2/2016 |

\* cited by examiner

MULTILAYER CAPACITOR

CROSS-REFERENCE TO RELATED APPLICATION(S)

This application claims benefit of priority to Korean Patent Application No. 10-2018-0105798 filed on Sep. 5, 2018 and Korean Patent Application No. 10-2018-0122624 filed on Oct. 15, 2018 in the Korean Intellectual Property Office, the disclosures of which are incorporated herein by references in their entirety.

TECHNICAL FIELD

The present disclosure relates to a multilayer capacitor.

BACKGROUND

A capacitor is a device which may store electrical power. In a capacitor, two electrodes may be configured to oppose each other such that when voltage is applied, electrical power may be accumulated in each electrode. When a direct current voltage is applied, electrical power may be stored and current may flow in the capacitor, and when the storing of electrical power is completed, current may not flow. When an alternating current is applied, polarities of the electrodes may be alternated and alternating current may flow.

Depending on a type of an insulator provided between electrodes, there may be various types of capacitors, such as an aluminum electrolytic capacitor including electrodes formed of aluminum and including a thin oxide film between the electrodes, a tantalum capacitor using tantalum as a material of electrodes, a ceramic capacitor in which a dielectric of a high dielectric constant such as barium titanium is used between electrodes, a multilayer ceramic capacitor (MLCC) using a multilayer structure of ceramic of a high dielectric constant as a dielectric provided between electrodes, a film capacitor using a polystyrene film as a dielectric between electrodes, and the like.

Among the different types of capacitors, a multilayer ceramic capacitor may have improved temperature properties and frequency properties, and may have a reduced size such that a multilayer ceramic capacitor has been increasingly applied in various fields such as a radio frequency circuit, and the like.

A general multilayer ceramic capacitor may include a stack body formed by stacking a plurality of dielectric sheets, external electrodes having different polarities may be disposed externally on the stack body, and internal electrodes alternately stacked in the stack body may be electrically connected to external electrodes, respectively.

As electronic products have been designed to have reduced sizes and high integration density, there has been a great volume of research into implementing a reduced size and high integration density in a multilayer ceramic capacitor. Particularly, to implement high capacitance and a reduced size in a multilayer ceramic capacitor, there have been various attempts to improve connectivity of internal electrodes by reducing a thickness of a dielectric layer and layering a higher number of dielectric layers.

Also, in the development of a multilayer ceramic capacitor having ultra-high capacitance, it has been more important to secure reliability of a product including thin dielectric layers and a higher number of internal electrodes stacked therein. The higher the number of the layers, the more a stepped portion formed by a difference between thicknesses of an internal electrode and a dielectric layer may further increase. Such a stepped portion may cause warpage of an end of an electrode due to the elongation of a dielectric layer in a lateral direction in a densification process for compressing a body.

An end of an internal electrode may be bent to fill the stepped portion, and an empty space of a margin portion formed by the stepped portion may be removed as a cover is recessed and a margin width is reduced. As the empty space formed by the stepped portion is removed, a capacitance layer may also be elongated by as much as the reduced margin width. Due to the irregular elongation of an internal electrode, reliability of a multilayer ceramic capacitor, such as withstand voltage properties, and the like, may degrade.

To address the issue described above, a method of cutting both side surfaces of a body formed in a length direction and attaching side surface margin portions have been developed, but the method may be complex, such that productivity may decrease, and when a thickness of the side surface margin portion is reduced, a thickness of a corner margin portion is also reduced at the same time such that moisture resistance reliability may be deteriorated.

SUMMARY

An aspect of the present disclosure is to provide a multilayer capacitor which may have an increased effective volume and may secure moisture resistance reliability.

According to an aspect of the present disclosure, a multilayer capacitor is provided, the multilayer capacitor including a body having a stack structure of a plurality of dielectric layers, and a plurality of internal electrodes stacked with the plurality of dielectric layers interposed therebetween, and an external electrode disposed an an external portion of the body and electrically connected to the plurality of internal electrodes. The body includes an active portion in which the plurality of internal electrodes are disposed to form capacitance, and an upper cover and a lower cover portion disposed on each of an upper portion and a lower portion of the active portion in a layering direction of the plurality of dielectric layers, respectively, the body includes a first surface and a second surface exposing the plurality of internal electrodes and opposing each other, a third surface and a fourth surface opposing each other in the layering direction of the plurality of dielectric layers, and a fifth surface and a sixth surface connected to the first to fourth surfaces and opposing each other, each of the upper and lower the cover portions of the body has curved corners, and a radius of curvature, R, of each of the curved corners and a thickness, T, of the body satisfy 10 μm≤R≤T/3, and a width, W, and a thickness, T, of the body satisfy T/W<0.8.

Corners of the upper cover portion at which the third surface is connected to the fifth surface and the sixth surface, and corners of the lower cover portion at which the fourth surface is connected to the fifth surface and the sixth surface may be curved.

A distance from a surface of the body to a closest internal electrode among the plurality of internal electrodes is defined as a margin, δ, of each of the curved corners of the each of the upper and lower cover portions, and the margin, δ, may be greater than or equal to a margin Wg from the fifth surface to the plurality of internal electrodes or from the sixth surface to the plurality of internal electrodes.

δ and Wg may satisfy 1≤δ/Wg≤1.2.

Wg may satisfy 0.5 μm≤Wg≤T/9.

Wg may satisfy 0.5 μm≤Wg≤15 μm.

A margin Tg from each of the third surface to an uppermost internal electrode of the plurality of internal electrodes or from the fourth surface to a lowermost internal electrode of the plurality of internal electrodes may satisfy 0.8≤Tg/Wg≤1.2.

The margin δ may be equal to the radius of curvature R.

The width W and the thickness T of the body may satisfy T/W<0.6.

The plurality of internal electrodes may have a uniform thickness.

An outer region of the body surrounding the plurality of internal electrodes is defined as a margin region, and density of dielectric layers in the margin region may be less than density of the plurality of dielectric layers.

The margin region may include at least two dielectric layers having different densities of the dielectric layers, and a density of one of the at least two dielectric layers may be higher than a density of another of the at least two dielectric layers which is more adjacent to the plurality of internal electrodes.

The margin region may include a plurality of needle-type pores.

The plurality of needle-type pores may be configured to be aligned to correspond to an external shape of the body.

The alignment of the plurality of needle-type pores disposed to correspond to the external shape of the body is defined as a column, and the plurality of needle-type pores may form a plurality of columns.

According to another aspect of the present disclosure, a multilayer capacitor is provided, the multilayer capacitor including a body including an active portion in which first and second internal electrodes are disposed with first dielectric layers disposed therebetween, the first and second internal electrodes exposed from first and second end surfaces of the active region, respectively; and first and second external electrodes disposed on the first and second end surfaces of the active region and electrically connected to the first and second internal electrodes, respectively. The body may further include second dielectric layers as a margin portion surrounding the active portion except the first and second end surfaces of the active portion, and the second dielectric layers may be in direct contact with the first and second internal electrodes, and have a density less than that of the first dielectric layers.

Each of the second dielectric layers may include needle-type pores having longer axes extending along an exterior surface of the active region.

A density of an inner layer of the second dielectric layers may be less than a density of an outer layer of the second dielectric layers.

In a layering direction of the first dielectric layers, the second dielectric layers may be in direct contact with the active region.

The body may include a third surface and a fourth surface opposing each other in a layering direction of the first dielectric layers, and a fifth surface and a sixth surface connected to the third and fourth surfaces and opposing each other. Corners of the margin portion at which the third surface is connected to the fifth surface and the sixth surface, and corners of the margin portion at which the fourth surface is connected to the fifth surface and the sixth surface are curved. A radius of curvature, R, of each of the curved corners and a thickness, T, of the body may satisfy 10 μm≤R≤T/3.

A width, W, and a thickness, T, of the body may satisfy T/W<0.8.

A distance from a surface of the body to a closest internal electrode among the first and second internal electrodes may be defined as a margin, δ, of each of the curved corners, and the margin, δ, may be greater than or equal to a margin, Wg, from the fifth surface to the plurality of internal electrodes or from the sixth surface to the plurality of internal electrodes.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
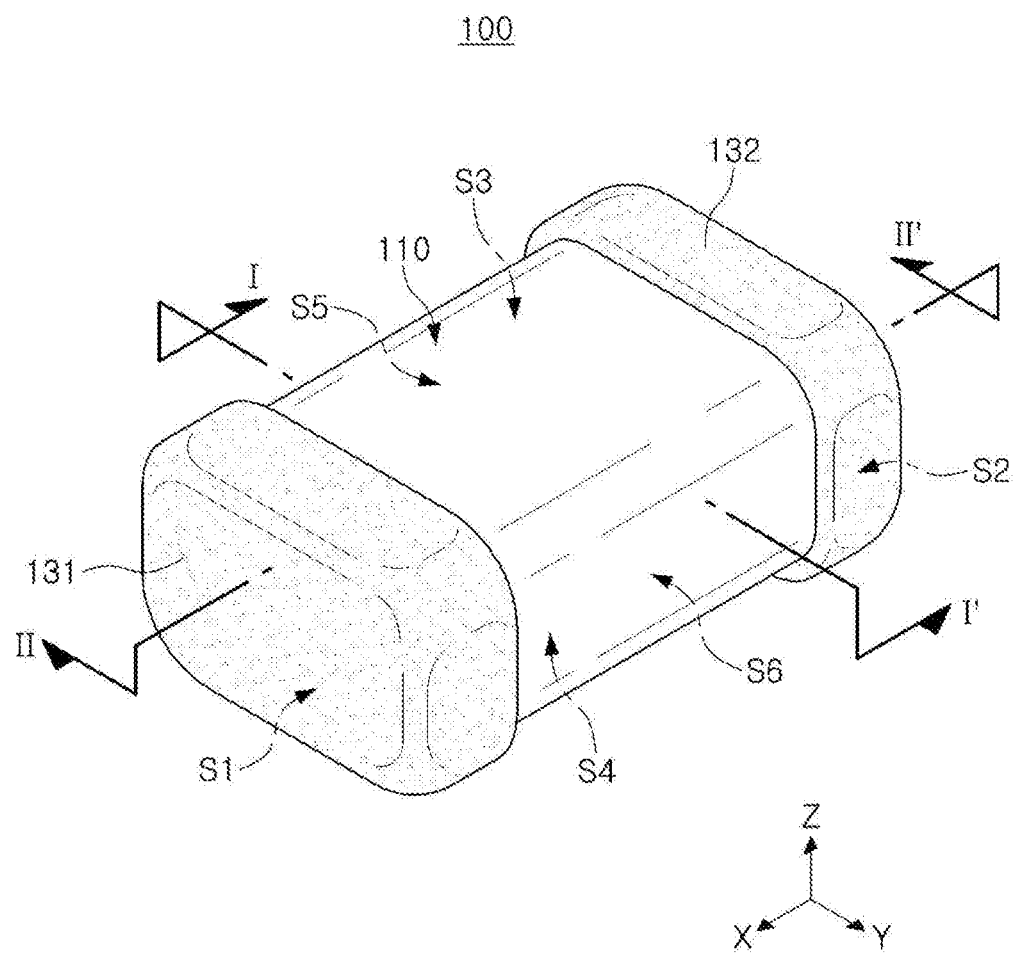
FIG. 1 is a perspective diagram illustrating an exterior of a multilayer capacitor according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art. Accordingly, shapes and sizes of the elements in the drawings can be exaggerated for clear description. Also, elements having the same function within the scope of the same concept represented in the drawing of each exemplary embodiment will be described using the same reference numeral.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numeral. Further, throughout the specification, it will be understood that when a part "includes" an element, it can further include another element, not excluding another element, unless otherwise indicated.

Figure 2:
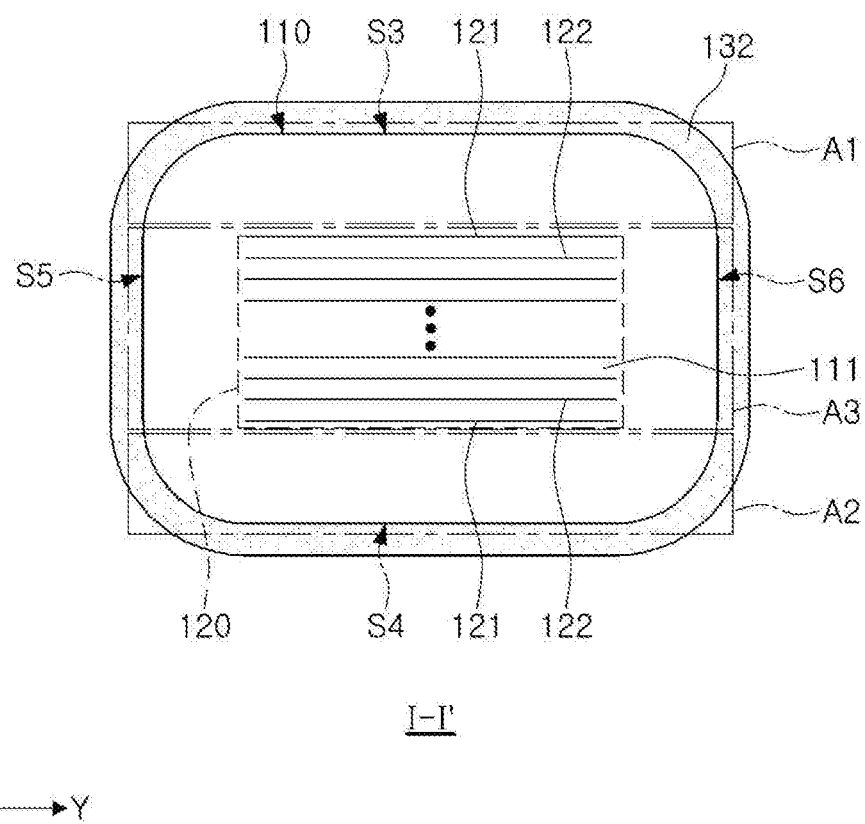
FIG. 2 is a cross-sectional diagram illustrating a multilayer capacitor taken along line I-I' in FIG. 1.
Figure 3:
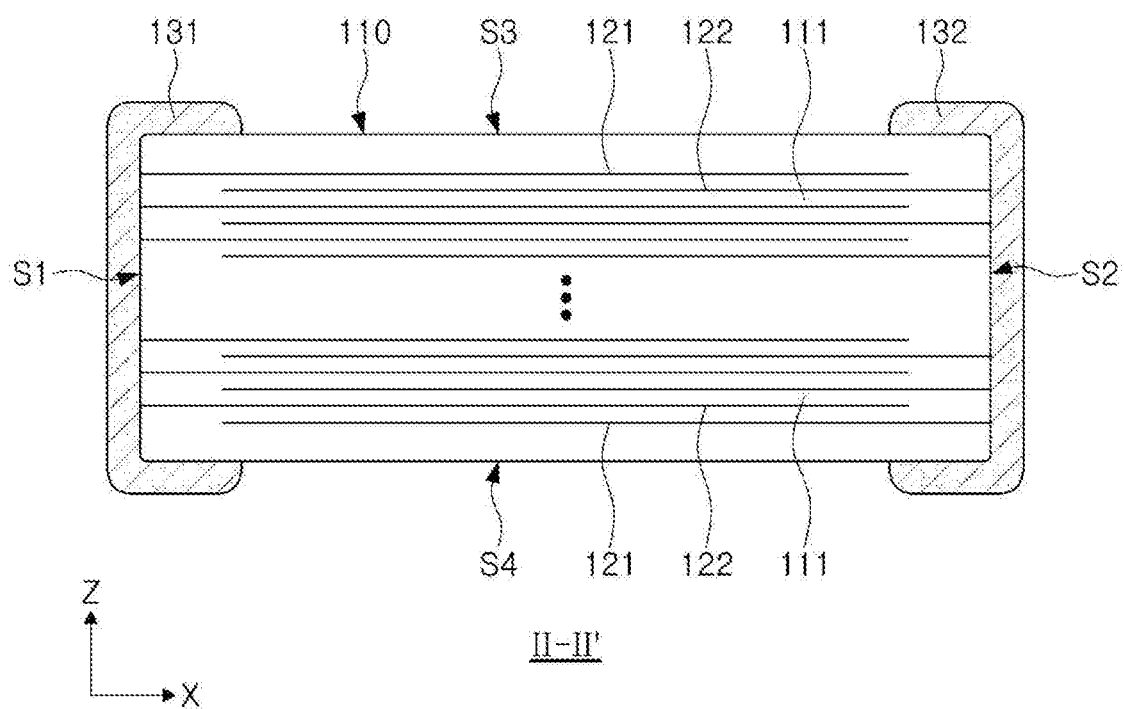
FIG. 3 is a cross-sectional diagram illustrating a multilayer capacitor taken along line II-II' in FIG. 1.
Figure 4:
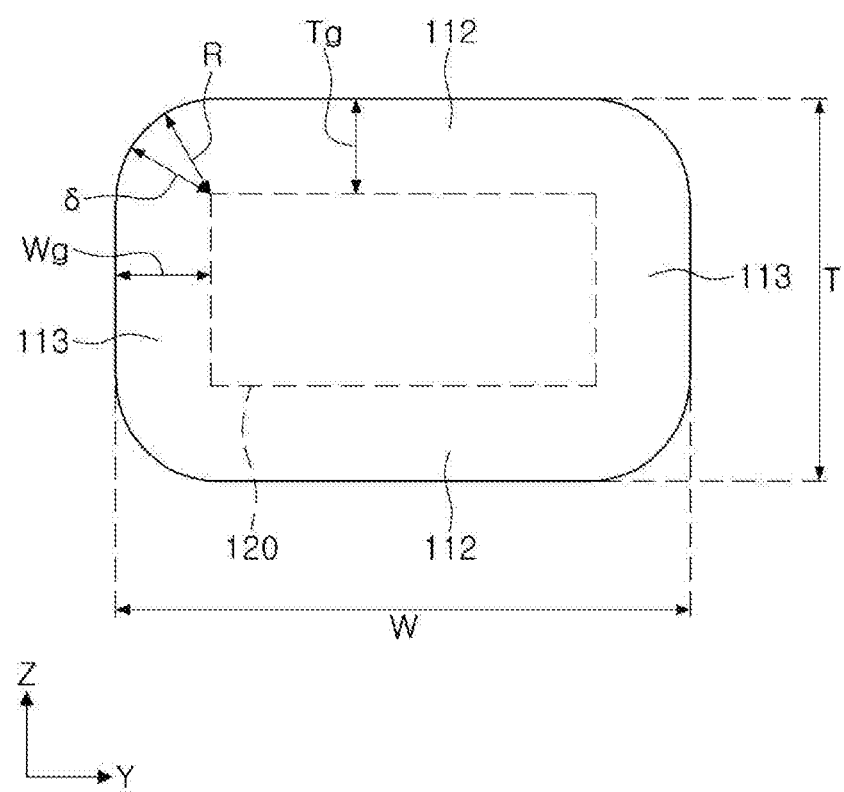
FIG. 4 is a cross-sectional diagram illustrating a multilayer capacitor taken along line I-I' in FIG. 1, in which an outline of a region in which an internal electrode is disposed is marked by a dotted line.

FIG. 1 is a perspective diagram illustrating an exterior of a multilayer capacitor according to an example embodiment. FIGS. 2 and 4 are cross-sectional diagrams illustrating a multilayer capacitor taken along line I-I' in FIG. 1, and in FIG. 4, an outline of a region in which an internal electrode is disposed is marked by a dotted line. FIG. 3 is a cross-sectional diagram illustrating a multilayer capacitor taken along line II-II' in FIG. 1.

Referring to FIGS. 1 to 4, a multilayer capacitor 100 of the example embodiment may include a body 110 including dielectric layers 111 and a plurality of internal electrodes 121 and 122 stacked with the dielectric layers interposed therebetween, and external electrodes 131 and 132, and cover portions A1 and A2 of the body 110 may have curved corners. In this case, a radius of curvature R of each of the curved corners of the cover portions A1 and A2 in the body 110, and a thickness T of the body 110 may satisfy a condition of 10 μm≤R≤T/3. Also, a width W and a thickness T of the body 110 may satisfy a condition of T/W<0.8, and the body 110 may have a low profile structure in which a width W is less than a thickness T.

The body 110 may have a form in which a plurality of dielectric layers 111 are layered, and may be obtained by layering a plurality of green sheets and sintering the layered green sheets. By the sintering process, the plurality of dielectric layers 111 may have an integrated form. A shape and a size of the body 110, and the number of the plurality of layered dielectric layers 111 may not be limited to an example illustrated in the diagram. For example, as illustrated in FIG. 1, the body 110 may have a form similar to a hexahedron. The body 110 may include a first surface S1 and a second surface S2 exposing the internal electrodes 121 and 122, respectively, a third surface S3 and a fourth surface S4 opposing each other in a layering direction (Z) of the plurality of dielectric layers 111, and a fifth surface S5 and a sixth surface S6 connected to the first to fourth surfaces S1, S2, S3, and S4 and opposing each other.

The dielectric layer 111 included in the body 110 may include a ceramic material having a high dielectric constant, and may include a BT based material, such as barium titanate ($BaTiO_3$) ceramic, for example. Another well-known material may also be used as along as sufficient capacitance may be obtained. If desired, the dielectric layer 111 may further include additives, organic solvents, plasticizer, coupling agents, dispersing agents, and the like, in addition to the ceramic material, a main element. The additives may include a metal element and may be added in a metal oxide form during a manufacturing process. As an example of the metal oxide additive, at least one of $MnO_2$, $Dy_2O_3$, $BaO$, $MgO$, $Al_2O_3$, $SiO_2$, $Cr_2O_3$, and $CaCO_3$ may be included.

The internal electrodes 121 and 122 may be obtained by printing paste including a conductive metal on one surface of a ceramic green sheet in a certain thickness and sintering the paste. In this case, the plurality of internal electrodes 121 and 122 may include the first and second internal electrodes 121 and 122 exposed from the first surface S1 and the second surface S2 of the body 110 opposing each other as in the example illustrated in FIG. 3. In this case, the internal electrodes 121 and 122 may be connected to different external electrodes 131 and 132 such that the internal electrodes 121 and 122 may have different polarities when being driven, and may be electrically isolated from each other by the dielectric layer 111 disposed therebetween. As illustrated in the diagram, the internal electrodes 121 and 122 may have a uniform thickness. The number of the external electrodes 131 and 132 and a method of connecting the external electrodes 131 and 132 to the internal electrodes 121 and 122 may vary in example embodiments. As a main material of the internal electrodes 121 and 122, nickel (Ni), copper (Cu), palladium (Pd), silver (Ag), and the like, or alloys thereof, may be used.

The external electrodes 131 and 132 may be disposed on an external portion of the body 110, and may include the first and second external electrodes 131 and 132 electrically connected to the first and second internal electrodes 121 and 122, respectively. The external electrodes 131 and 132 may be formed by spraying paste manufactured using a material including a conductive metal on the body 110. As an example of a conductive metal, there may be nickel (Ni), copper (Cu), palladium (Pd), gold (Au), or alloys thereof. The external electrodes 131 and 132 may further include a plating layer to mount the multilayer capacitor 100 on a substrate if desired.

In the example embodiment, the corners of the body 110 may be configured to be curved to prevent a chipping defect. Structural properties of the body 110 in the example embodiment may also be represented differently. For example, when a distance from a surface of the body 110 to the closest internal electrode among the plurality of internal electrodes 121 and 122 is defined as a margin, a margin of the curved corner of the cover portions A1 and A2 may be greater than or the same as a margin of the body taken in a width direction. The configuration will be described later.

In the example embodiment, optimal examples of a size, a radius of curvature of the curved surface, a thickness, and a length of the margin may be implemented to improve performance. By implementing such a structure, a size of the multilayer capacitor 100 may be reduced, higher level of capacitance may be secured, and moisture resistance reliability may improve. In the description below, the configuration will be described in greater detail.

The body 110 may include an active portion A3 and cover portions A1 and A2, and the active portion A3 may be a region in which the plurality of internal electrodes 121 and 122 may be disposed to form capacitance. The cover portions A1 and A2 may be positioned in an upper portion and a lower portion of the active portion A3 in a layering direction (a Z direction in the diagram) of the plurality of dielectric layers 111.

As described above, the corners of the cover portions A1 and A2 of the body 110 may be configured to be curved, and the curved corners may reduce a chipping defect of the multilayer capacitor 100, and may resolve other issues. For example, the corners (the curved corners in an upper portion in FIG. 2) of the cover portion A1 at which the third surface S3 is connected to the fifth surface S5 and the sixth surface S6, and the corners (the curved corners in a lower portion in FIG. 2) of the cover portion A2 at which the fourth surface S4 is connected to the fifth surface S5 and the sixth surface S6 may be configured to be curved. For convenience of illustration, in FIG. 2, the active portion A3 and the cover portions A1 and A2 are denoted by a rectangle, respectively. However, a boundary of each of the active portion A3 and the cover portions A1 and A2 may extend to a respective exterior surface of the body 110, not to a side of the respective rectangle that is superimposed on the external electrode 132 in the cross-sectional diagram shown in FIG. 2.

Example optimal conditions of a size, a radius of curvature of the curved surface, a thickness, and a length of the margin in the body 110 will be described with reference to FIG. 4. In FIG. 4, a region in which the internal electrodes are disposed may be defined as an internal electrode region 120 and is marked by a dotted line. In this case, a Z direction is defined as a direction of a thickness of the body 110, and a Y direction is defined as a direction of a width of the body 110, thereby defining a thickness T and a width W of the body 110.

A margin of the body 110 may be defined as a distance from a surface to the closest internal electrode among the plurality of internal electrodes. For example, a margin of each of the curved corners of the cover portions A1 and A2 may be δ. A margin of each of the fifth surface S5 and the sixth surface S6 may be Wg, which may be a margin taken in a width direction of the body 110. In the example embodiment, the margin δ of the curved corner may be configured to be greater than or equal to the margin Wg taken in a width direction. In a general multilayer capacitor, it may be difficult to form a width direction margin as the internal electrodes are not aligned. To address the issue, a process for forming a width direction margin may be used. In such a structure, however, it may be difficult to sufficiently secure a margin δ of the curved corner of the body 110, and when a size of the body 110 is reduced, and the number of stacked internal electrodes is increased, moisture resistance reliability may degrade. Also, the body 110 may need to be rotated by 90 degrees to form a width direction margin, and when the body 110 having a low profile form as in the example embodiment is rotated by 90 degrees, structural stability may degrade such that it may be difficult to smoothly perform the margin forming process. According to the experimentations performed by the inventors, under a condition of T/W<0.6, it was difficult to apply a general method of attaching a side margin. Thus, the multilayer capacitor of the example embodiment may be effective under a condition of T/W<0.6.

In the example embodiment, corners of the body 110, specifically the corners of the cover portions A1 and A2, may be configured to be curved, which may be appropriate to form a margin region in the body 110 having a low profile form. By implementing such a form, a margin δ of each of the curved corners may be sufficiently secured, and the margin δ may be greater than or equal to a width direction margin Wg. The margin δ of the curved corner and the width direction margin Wg may satisfy a condition of 1≤δ/Wg≤1.2. When the margin δ of the curved corner exceeds 1.2 times of the width direction margin Wg, widths of the internal electrodes 121 and 122 in the cover portions A1 and A2 may be greatly reduced such that capacitance may decrease.

As the margin δ of the curved corner increases, moisture resistance reliability may improve in the body 110 having a reduced size, and the body 110 may implement improved capacitance by including a plurality of the internal electrodes 121 and 122. The improved capacitance may refer to capacitance measured with reference to the same volume of the body 110, which is an increased effective volume.

In the example embodiment, the internal electrodes 121 and 122 disposed in the active portion A3 may have a uniform thickness, which may be obtained by a process of cutting a ceramic stack body into individual chips. The uniformity of the thickness may be determined based on positions of ends of the internal electrodes 121 and 122. For example, a deviation between positions of ends of the internal electrodes 121 and 122 may be equal to or less than 0.1 μm in the width direction (Y direction).

A margin taken in a thickness direction of the body 110, a margin Tg and a width direction margin Wg of each of the third surface S3 and the fourth surface S4, may satisfy a condition of 0.8≤Tg/Wg≤1.2. The thickness direction margin Tg and the width direction margin Wg may be formed through the same process, and may thus have similar sizes. When the dielectric layer 111, a base layer used as a cover, is formed in uppermost and lowermost internal electrodes 121 and 122, the thickness direction margin Tg may be slightly greater than the width direction margin Wg, but Tg/Wg may not exceed 1.2.

The width direction margin Wg may satisfy a condition of 0.5 μm≤Wg≤15 μm, which may be configured to secure moisture resistance reliability and sufficient capacitance. Similarly, the thickness direction margin Tg may also satisfy the condition of 0.5 μm≤Tg≤15 μm. The width direction margin Wg may be determined in consideration of the thickness T of the body 110, and may satisfy a condition of 0.5 μm≤Wg≤T/9. The thickness T of the body 110 may be 100 to 400 μm.

The radius of curvature R of each of the curved corners of the cover portions A1 and A2 may be configured to endure chipping impacts caused by a weight of the multilayer capacitor 100 and load occurring during processes. The radius of curvature R may satisfy a condition of 10 μm≤R≤60 μm. The radius of curvature R may be determined in consideration of a thickness T of the body 110, and may satisfy a condition of 10 μm≤R≤T/3. As described above, the thickness T of the body 110 may be 100 to 400 μm. As illustrated in the example in FIG. 4, a radius of curvature R of the curved corner of the cover portions A1 and A2 may be the same as the margin δ, and in this case, the curved corner may be a portion of the curved surface. The radius of curvature R may also be different from the margin δ depending on a shape of the curved corner of the cover portions A1 and A2. For example, each of the curved corners of the cover portions A1 and A2 may be configured to be aspheric.

When an outer region of the body 110 surrounding the plurality of internal electrodes 121 and 122, a region surrounding the internal electrode region 120 in FIG. 4, is defined as margin regions 112 and 113, density of the dielectric layer 111 in the margin regions 112 and 113 may be less than density of the dielectric layer 111 in a remaining region. The margin regions 112 and 113 may be obtained by, after manufacturing a ceramic stack body, coating the ceramic stack body, and other processes, and the difference in density may be caused by different manufacturing methods. The density may be inversely proportional to density of pores present in the dielectric layer 111.

An example of a method of manufacturing the multilayer capacitor described above will be described with reference to FIGS. 5 to 13.

Figure 5:
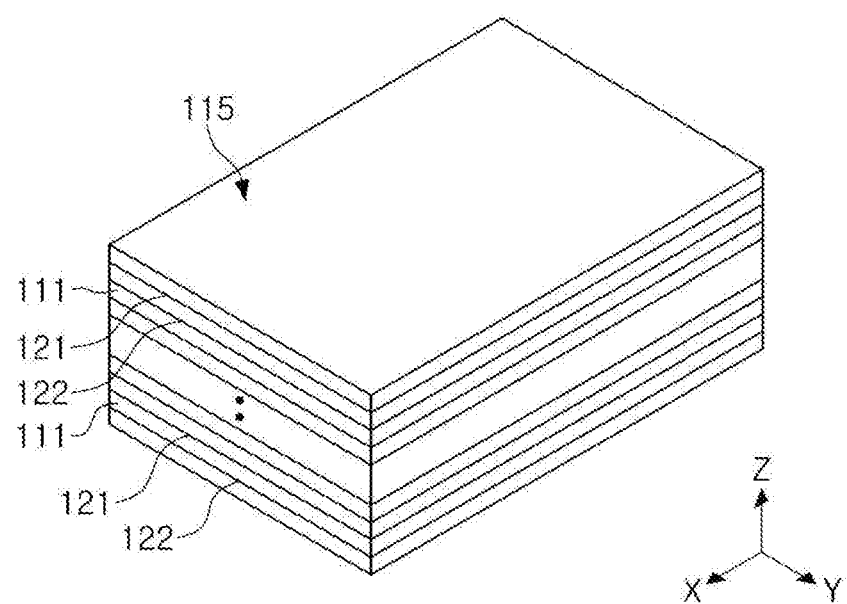
FIGS. 5 to 13 are processes for manufacturing a multilayer capacitor according to an example embodiment of the present disclosure.
Figure 6:
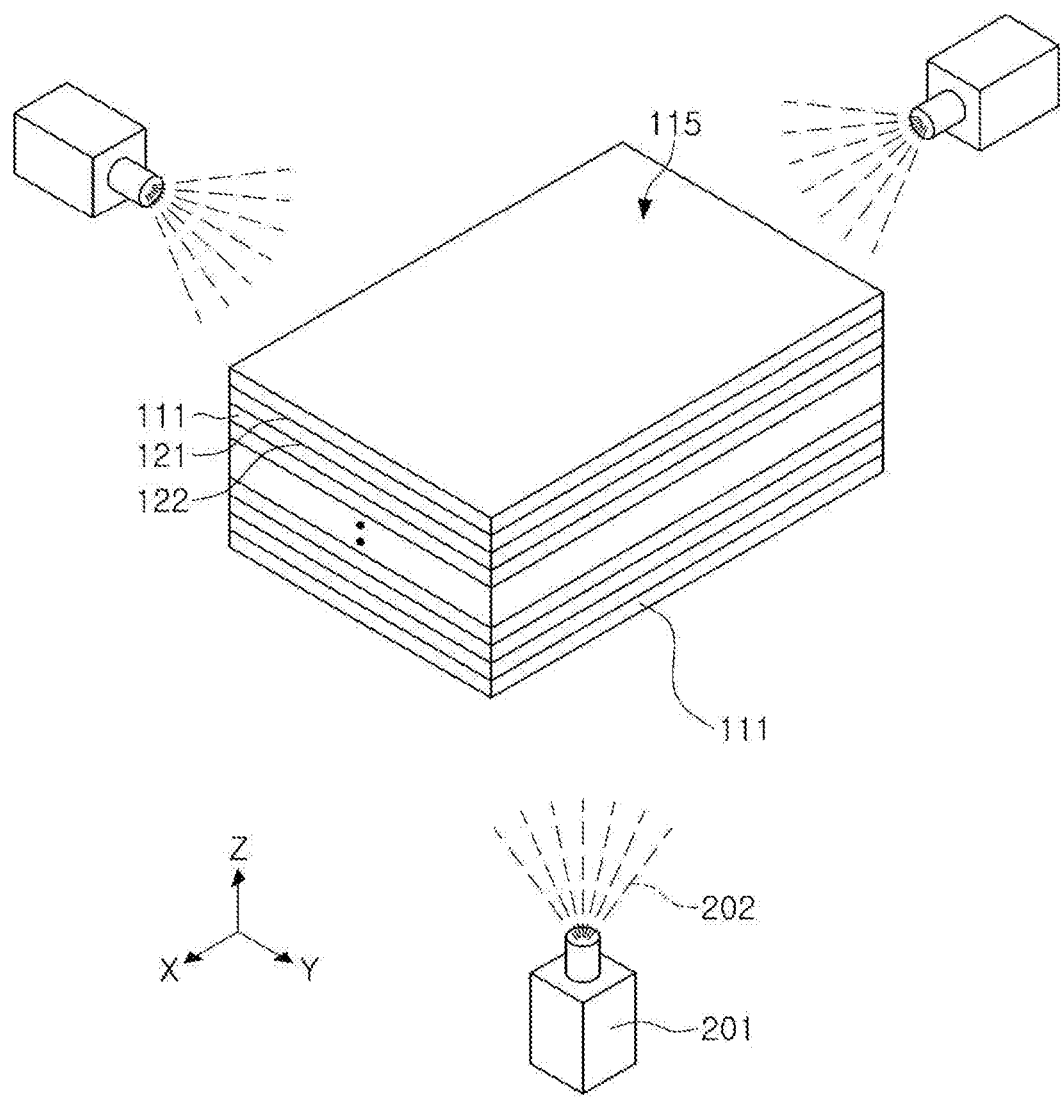
Figure 7:
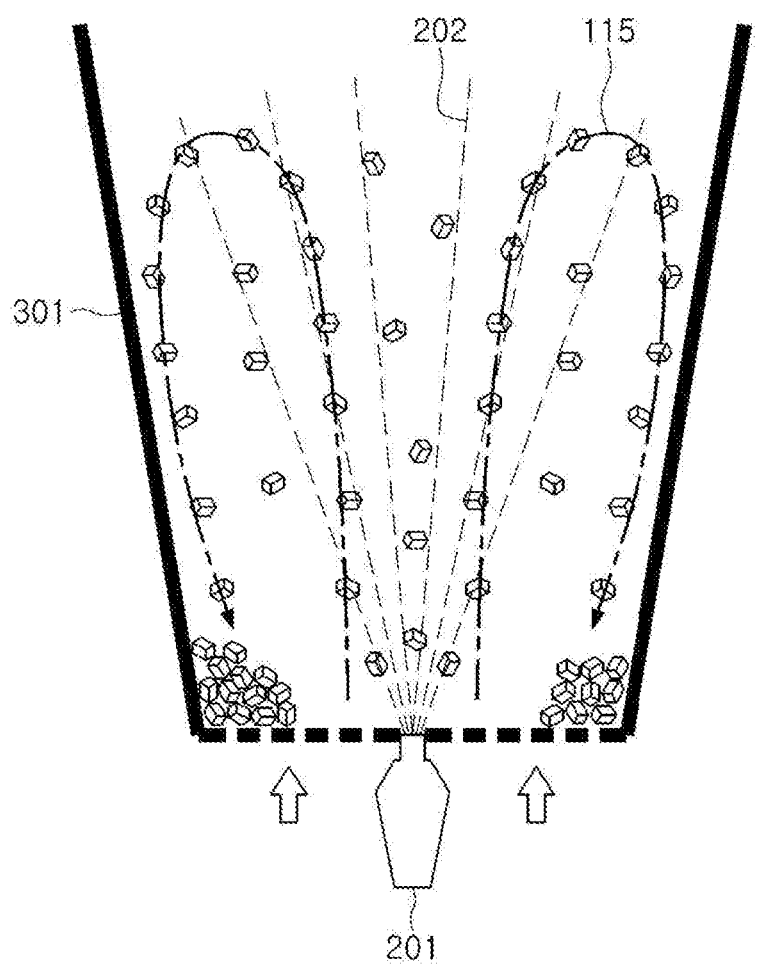
Figure 8:
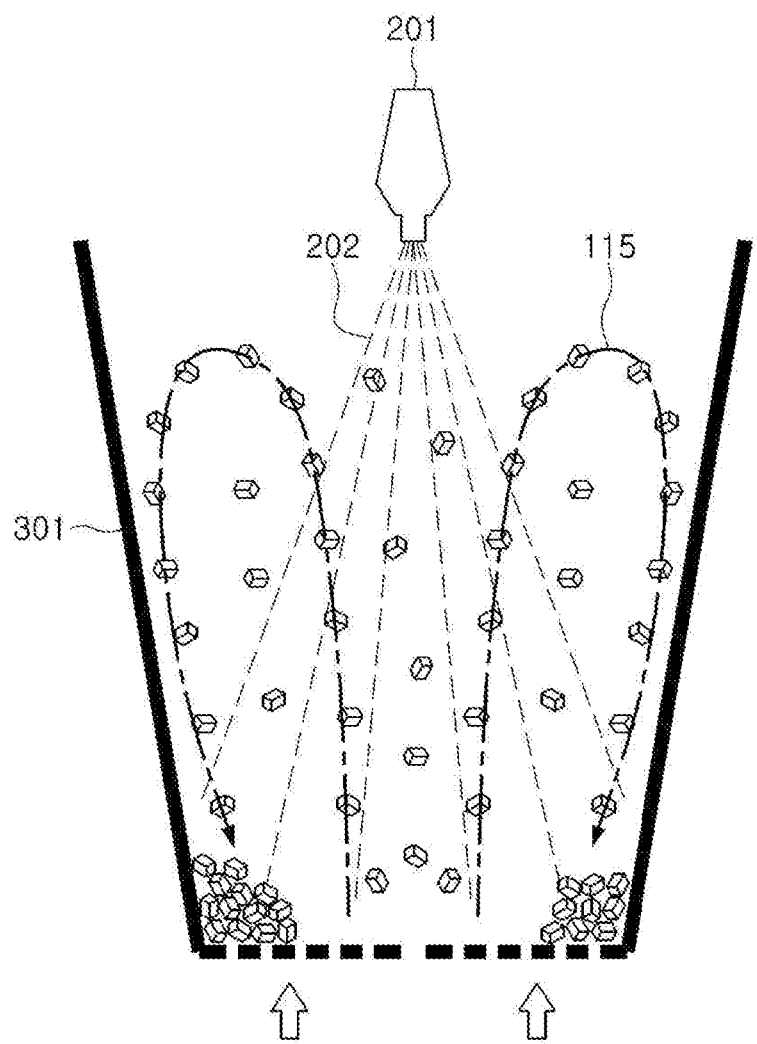

As illustrated in FIG. 5, a ceramic stack body 115 may be prepared by layering dielectric layers 111 and internal electrodes 121 and 122. As the dielectric layer 111 is not yet sintered, the dielectric layer 111 may be a ceramic green sheet state. The ceramic green sheet may be obtained by manufacturing a sheet having a thickness of several μm from a slurry, manufactured from a mixture of a ceramic powder, a binder, a solvent, and the like, using a doctor blade method. The ceramic green sheet may be sintered, and the dielectric layer 111 may be formed.

Conductive paste for an internal electrode may be sprayed on the ceramic green sheet, and an internal electrode pattern may be formed. The internal electrode pattern may be formed by a screen printing method of a gravure printing method. The conductive paste for an internal electrode may include a conductive metal and additives, and the additives may be one or more of a non-metal oxide and a metal oxide. The conductive metal may include nickel. The additive may include barium titanate or strontium titanate.

A plurality of the ceramic green sheets on each of which an internal electrode pattern is formed may be layered, and the layered ceramic green sheets may be compressed, thereby implementing the ceramic stack body 115. The ceramic stack body 115 may include the dielectric layer 111 as a base layer used for a cover disposed in an uppermost portion and a lowermost portion, and may thus effectively protect the internal electrodes 121 and 122 using the dielectric layer. Alternatively, the dielectric layer 111 may not be disposed in an uppermost portion and a lowermost portion of the ceramic stack body 115.

After the ceramic stack body 115 is formed, the ceramic stack body 115 may be cut into individual chip units if desired. In this case, the internal electrodes 121 and 122 may be configured to be exposed to be connected to external electrodes. The internal electrodes 121 and 122 exposed by the cutting process may have a uniform width. For example, a difference between the greatest width and the smallest width of the internal electrodes 121 and 122 may be less than 0.1 μm.

A coating layer 118 (in FIG. 10) may be formed on a surface of the ceramic stack body 115 by performing an appropriate coating process. In the example embodiment, a method of spray-coating the surface with ceramic slurry 202 using a spraying device 201 as illustrated in the example in FIG. 6. In this case, the ceramic slurry 202 may include the same elements as those of the green sheet for forming the dielectric layer 111, or may further include an element for endowing liquidity to the green sheet, such as liquid binder, and the like, for example. As an example of the coating process, as illustrated in the examples in FIGS. 7 and 8, the ceramic stack body 115 may be disposed in a coating device 301, and an air flow may be generated towards an upper portion from a lower portion (an arrow in FIGS. 7 and 8). After the ceramic stack body 115 floats, the ceramic slurry 202 may be sprayed through a nozzle of the spraying device 201 disposed in a lower portion (in FIG. 7) or in an upper portion (in FIG. 8). Differently from the example in the diagrams, the spraying device 201 may also be disposed in a side portion of the coating device 301. By the coating method, a coating layer 118 having a uniform thickness may be formed on a surface of the ceramic stack body 115. By forming the coating layer 118 separately after manufacturing the ceramic stack body 115, a margin region having a uniform and thin thickness may be formed, and a margin having a sufficient thickness may be obtained in the corner regions of the body which may be vulnerable to moisture.

Figure 9:
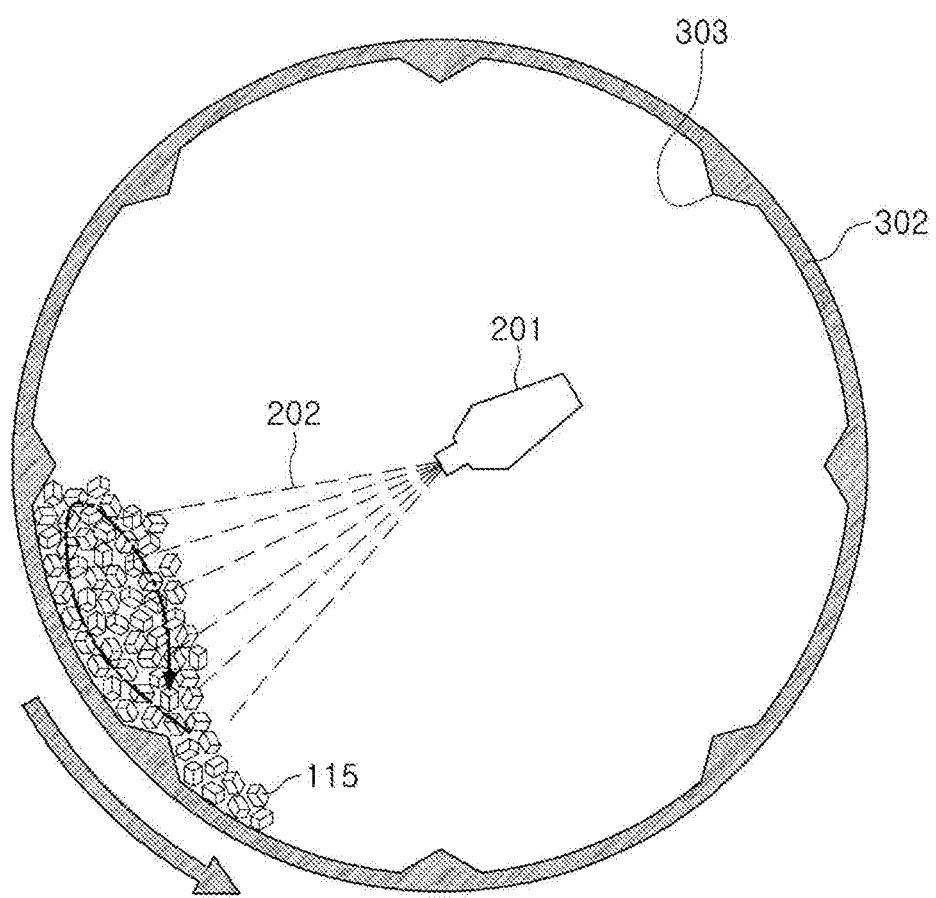

As another coating method, as illustrated in the example in FIG. 9, a coating device 302 having a spherical-shaped container may be used. In this case, a protrusion 303 may be formed in the coating device 302. When the coating device 302 rotates, the ceramic stack body 115 may turn over and move such that the ceramic stack body 115 may be uniformly coated.

Figure 10:
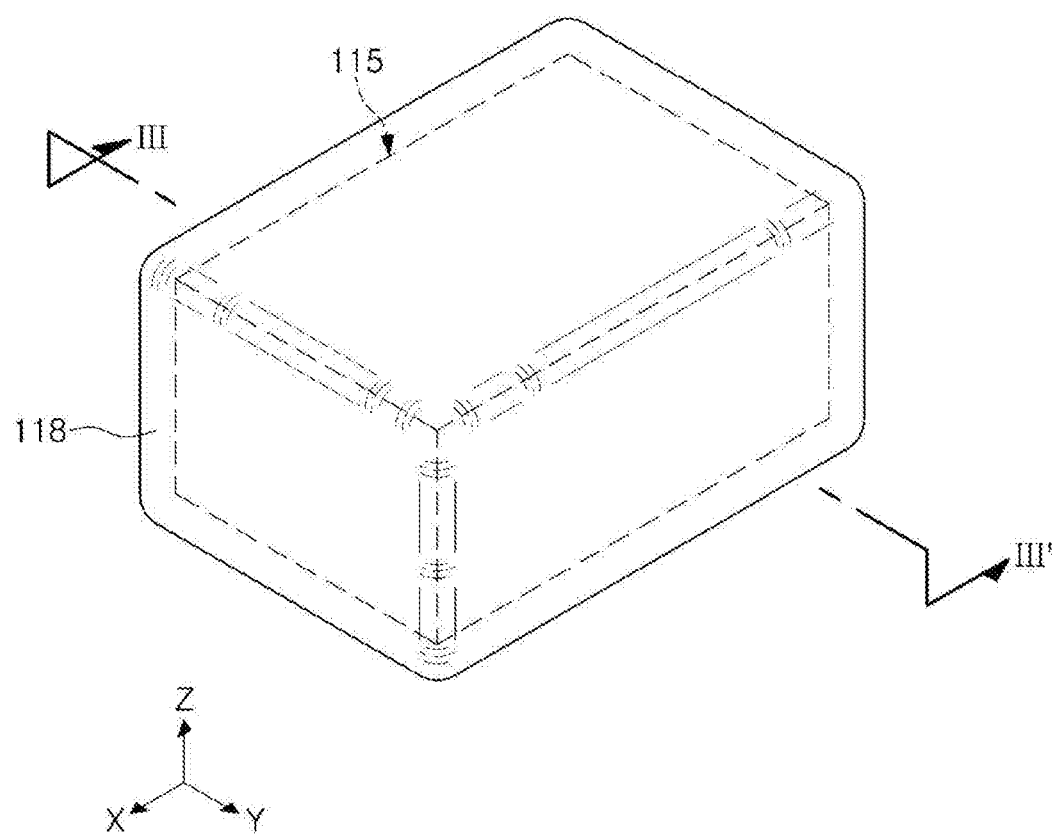
Figure 11:
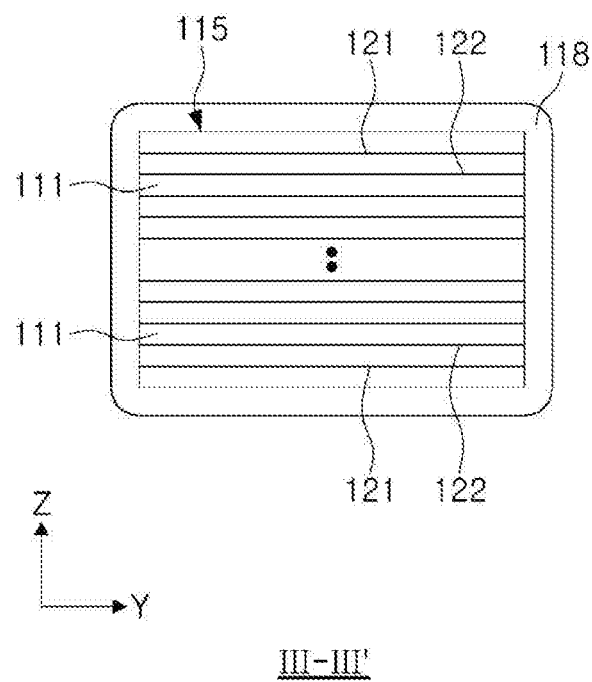

FIG. 10 is a diagram illustrating a state in which a coating layer 118 is formed on an overall surface of a ceramic stack body 115, and FIG. 11 is a cross-sectional diagram taken along line III-III' in FIG. 10. As illustrated in the diagrams, by performing the above-described coating process, the coating layer 118 may have curved corners. The ceramic stack body 115 may be sintered while the coating layer 118 is applied. Accordingly, the green sheets and the coating layer 118 included in the ceramic stack body 115 may be configured as an integrated body.

Figure 12:
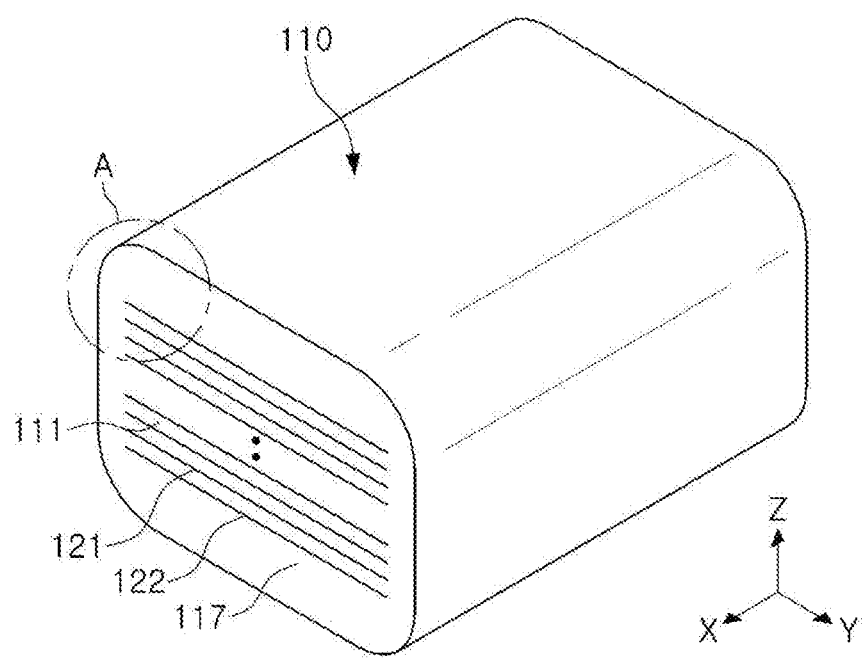

After the sintering process, a portion of the body 110 may be removed to expose the internal electrodes 121 and 122. The surfaces from which the internal electrodes 121 and 122 are exposed may be the first surface S1 and the second surface S2 illustrated in FIG. 1, and if desired, the internal electrodes 121 and 122 may be exposed from the other surfaces. As the surface grinding process for removing a portion of the body 110, a polishing process, a grinding process, and the like, may be used. FIG. 12 is a diagram illustrating an example of the body 110 after the sintering process and the grinding process, and examples of the internal electrodes 121 and 122 exposed from the body 110. Thereafter, external electrodes connected to the internal electrodes 121 and 122 may be formed.

Figure 13:
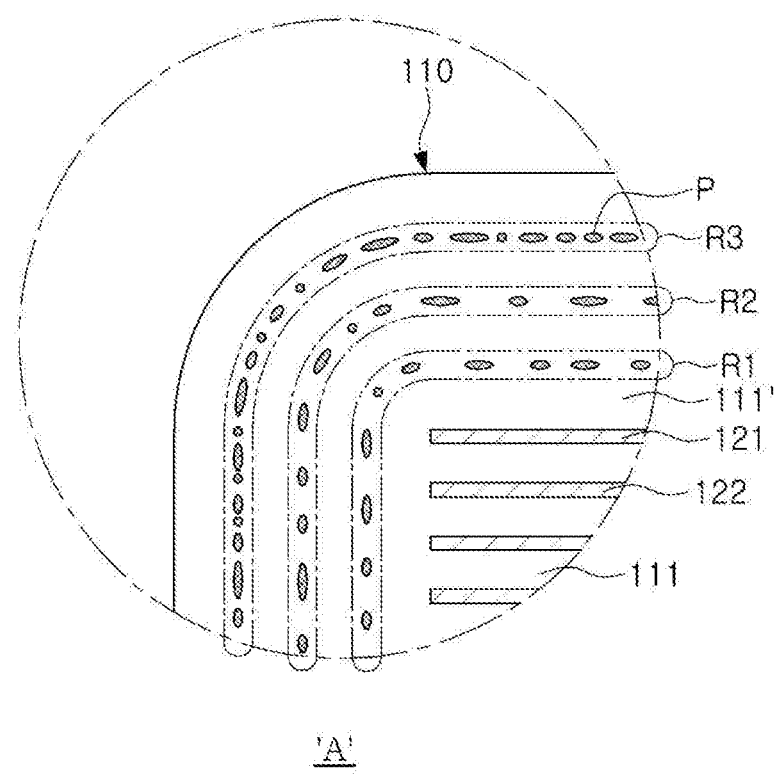

In the above-described process, as the dielectric layer 111 is formed using a ceramic green sheet, and the margin region is formed by the coating process of spraying ceramic slurry, there may be a difference in internal structures thereof after the sintering process. In other words, characteristics, such as density, in the internal electrode region 120 and in the margin regions 112 and 113 may be different from each other. The example configuration will be described with reference to FIG. 13. FIG. 13 is an enlarged plan diagram illustrating region A illustrated in FIG. 12.

Comparing density of the dielectric layer 111' in the margin region of the body 110 with density of the dielectric layer 111 in the other region (the internal electrode region), density of the dielectric layer 111' is relatively lower in the margin regions 112 and 113. Also, density of the dielectric layer 111' in a region of the margin regions 112 and 113 closer to the internal electrodes 121 and 122 may be higher than density of the dielectric layer 111' in a region closer to an external portion of the body 110. Thus, the margin regions 112 and 113 may include at least two layers including different densities of the dielectric layers 111, and among the at least two layers, density of the dielectric layer 111 may be higher in a layer more adjacent to the plurality of internal electrodes 121 and 122.

The density characteristic of the margin regions 112 and 113 may be obtained through the above-described coating process. When the ceramic slurry is sprayed, multiple thin coating layers may be formed and layered on a surface of the ceramic stack body 115, and a plurality of pores may be formed between the coating layers. The pores may remain even after the sintering process. As illustrated in FIG. 13, a plurality of needle-type pores P may remain in the margin regions 112 and 113 of the body 110. As the plurality of needle-type pores P are created in the process of forming the multiple thin coating layers, a plurality of columns R1, R2, and R3 formed by the pores may be aligned to correspond to an exterior shape of the body 110. That is, each of multiple thin coating layers may include needle-type pores having longer axes extending along an exterior surface of the active region or along the exterior shape of the body 110. The plurality of columns R1, R2, and R3 formed by the needle-type pores P may have different pore densities, and as a region closer to a surface of the body 110 is coated later than the other region, the region may have higher pore density.

According to the aforementioned example embodiments, the multilayer capacitor may have a reduced size and high capacitance, and may have improved reliability as moisture resistance reliability improves.

While the exemplary embodiments have been shown and described above, it will be apparent to those skilled in the art that modifications and variations could be made without departing from the scope of the present invention as defined by the appended claims.

What is claimed is:
1. A multilayer capacitor, comprising:
a body including a stack structure of a plurality of dielectric layers, and a plurality of internal electrodes stacked with the plurality of dielectric layers interposed therebetween; and
external electrodes disposed on an external portion of the body and connected to the plurality of internal electrodes,
wherein the body includes an active portion in which the plurality of internal electrodes are disposed to form capacitance, and an upper cover and a lower cover portion disposed on an upper portion and a lower portion of the active portion in a layering direction of the plurality of dielectric layers, respectively, wherein the body includes a first surface and a second surface exposing the plurality of internal electrodes and opposing each other in a length direction of the body, a third surface and a fourth surface opposing each other in the layering direction of the plurality of dielectric layers, and a fifth surface and a sixth surface connected to the first to fourth surfaces and opposing each other in a width direction of the body, wherein each of the upper and lower cover portions of the body has curved corners, wherein a radius of curvature, R, of a curved corner, in a width direction-layering direction plane, among the curved corners, and a thickness, T, of the body satisfy 10 µm<R<T/3, wherein a width, W, and a thickness, T, of the body satisfy T/W<0.8, wherein the radius of curvature, R, of the curved corner, in the layering direction-width direction plane, among the curved corners, is greater than a radius of curvature of a curved corner, in a length direction-layering direction, among the curved corners.

2. The multilayer capacitor of claim 1, wherein corners of the upper cover portion at which the third surface is connected to the fifth surface and the sixth surface, and corners of the lower cover portion at which the fourth surface is connected to the fifth surface and the sixth surface are curved.

3. The multilayer capacitor of claim 1, wherein, a distance from a surface of the body to a closest internal electrode among the plurality of internal electrodes is defined as a margin, δ, of each of the curved corners of the each of the upper and lower cover portions, and the margin, δ, is greater than or equal to a margin, Wg, from the fifth surface to the plurality of internal electrodes or from the sixth surface to the plurality of internal electrodes.

4. The multilayer capacitor of claim 3, wherein δ and Wg satisfy 1≤δ/Wg≤1.2.

5. The multilayer capacitor of claim 3, wherein Wg satisfies 0.5 µm≤Wg≤T/9.

6. The multilayer capacitor of claim 3, wherein Wg satisfies 0.5 µm≤Wg≤15 µm.

7. The multilayer capacitor of claim 3, wherein a margin, Tg, from the third surface to an uppermost internal electrode of the plurality of internal electrodes or from the fourth surface to a lowermost internal electrode of the plurality of internal electrodes satisfies 0.8≤Tg/Wg≤1.2.

8. The multilayer capacitor of claim 3, wherein the margin, δ, is equal to the radius of curvature, R.

9. The multilayer capacitor of claim 1, wherein the width, W, and the thickness, T, of the body satisfy T/W<0.6.

10. The multilayer capacitor of claim 1, wherein the plurality of internal electrodes have a uniform thickness.

11. The multilayer capacitor of claim 1, wherein, an outer region of the body surrounding the plurality of internal electrodes is defined as a margin region, and density of dielectric layers in the margin region is less than density of the plurality of dielectric layers.

12. The multilayer capacitor of claim 11, wherein the margin region includes at least two dielectric layers having different densities, and a density of one of the at least two dielectric layers is higher than a density of another of the at least two dielectric layers which is more adjacent to the plurality of internal electrodes.

13. The multilayer capacitor of claim 1, wherein the thickness T of the body is 100 to 400 µm.

14. A multilayer capacitor, comprising:
a body including a stack structure of a plurality of dielectric layers, and a plurality of internal electrodes stacked with the plurality of dielectric layers interposed therebetween; and
external electrodes disposed on an external portion of the body and connected to the plurality of internal electrodes,
wherein the body includes an active portion in which the plurality of internal electrodes are disposed to form capacitance, and an upper cover and a lower cover portion disposed on an upper portion and a lower portion of the active portion in a layering direction of the plurality of dielectric layers, respectively,
wherein the body includes a first surface and a second surface exposing the plurality of internal electrodes and opposing each other, a third surface and a fourth surface opposing each other in the layering direction of the plurality of dielectric layers, and a fifth surface and a sixth surface connected to the first to fourth surfaces and opposing each other,
wherein each of the upper and lower cover portions of the body has curved corners, and a radius of curvature, R, of one of the curved corners and a thickness, T, of the body satisfy 10 µm≤R≤T/3,
wherein a width, W, and a thickness, T, of the body satisfy T/W<0.8,
wherein, an outer region of the body surrounding the plurality of internal electrodes is defined as a margin region, and density of dielectric layers in the margin region is less than density of the plurality of dielectric layers, and
wherein the margin region includes a plurality of needle-type pores.

15. The multilayer capacitor of claim 14, wherein the plurality of needle-type pores are aligned to correspond to an external shape of the body.

16. The multilayer capacitor of claim 15, wherein, the alignment of the plurality of needle-type pores disposed to correspond to the external shape of the body is defined as a column, and the plurality of needle-type pores form a plurality of columns.

17. A multilayer capacitor, comprising:
a body including an active portion in which first and second internal electrodes are disposed with first dielectric layers disposed therebetween, the first and second internal electrodes exposed from first and second end surfaces of the active region, respectively; and
first and second external electrodes disposed on the first and second end surfaces of the active region and connected to the first and second internal electrodes, respectively,
wherein the body further includes second dielectric layers as a margin portion surrounding the active portion except the first and second end surfaces of the active portion,
wherein the body includes a third surface and a fourth surface opposing each other in a layering direction of the first dielectric layers, and a fifth surface and a sixth surface connected to the third and fourth surfaces and opposing each other,
wherein corners of the margin portion at which the third surface is connected to the fifth surface and the sixth surface, and corners of the margin portion at which the fourth surface is connected to the fifth surface and the sixth surface are curved, wherein a radius of curvature, R, of one of the curved corners and a thickness, T, of the body satisfy $10 \; \mu m \leq R \leq T/3$, wherein a width, W, and a thickness, T, of the body satisfy $T/W < 0.8$, wherein the thickness T of the body is 100 to 400 μm, and wherein R is equal to or greater than a margin, Wg, from the fifth surface to the plurality of internal electrodes or from the sixth surface to the plurality of internal electrodes.

18. The multilayer capacitor of claim 17, wherein each of the second dielectric layers includes needle-type pores having longer axes extending along an exterior surface of the active region.

19. The multilayer capacitor of claim 17, wherein a density of an inner layer of the second dielectric layers is less than a density of an outer layer of the second dielectric layers.

20. The multilayer capacitor of claim 17, wherein in a layering direction of the first dielectric layers, the second dielectric layers are in direct contact with the active region.

21. The multilayer capacitor of claim 17, wherein a distance from a surface of the body to a closest internal electrode among the first and second internal electrodes is defined as a margin, δ, of each of the curved corners, and the margin, δ, is greater than or equal to a margin, Wg, from the fifth surface to the plurality of internal electrodes or from the sixth surface to the plurality of internal electrodes.

22. The multilayer capacitor of claim 17, wherein the second dielectric layers are in direct contact with the first and second internal electrodes, and have a density less than that of the first dielectric layers.

* * * * *